(12) United States Patent
Newman et al.

(10) Patent No.: US 11,425,744 B2
(45) Date of Patent: Aug. 23, 2022

(54) CASCADED SCHEDULING REQUESTS FOR RESOURCE-EFFICIENT 5G AND 6G

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes, CA (US)

( * ) Notice: Subject to any disclaimer, the term of this patent is extended or adjusted under 35 U.S.C. 154(b) by 0 days.

(21) Appl. No.: 17/710,141

(22) Filed: Mar. 31, 2022

(65) Prior Publication Data

US 2022/0225367 A1 Jul. 14, 2022

Related U.S. Application Data

(60) Provisional application No. 63/170,631, filed on Apr. 5, 2021, provisional application No. 63/170,633, filed on Apr. 5, 2021, provisional application No. 63/176,996, filed on Apr. 20, 2021, provisional application No. 63/210,216, filed on Jun. 14, 2021, provisional application No. 63/220,669, filed on Jul. 12, 2021, provisional application No. 63/317,177, filed on Mar. 7, 2022, provisional application No. 63/214,489, filed on Jun. 24, 2021, provisional application No. 63/321,879, filed on Mar. 21, 2022.

(51) Int. Cl.
*H04W 72/14* (2009.01)
*H04W 72/12* (2009.01)

(52) U.S. Cl.
CPC ....... *H04W 72/1268* (2013.01); *H04W 72/14* (2013.01)

(58) Field of Classification Search
CPC .................. H04W 72/1268; H04W 72/14
See application file for complete search history.

(56) References Cited

U.S. PATENT DOCUMENTS

| | | |
|---|---|---|
| 2006/0011482 A1 | 6/2006 | Brommer |
| 2007/0089036 A1 | 4/2007 | Jiang |

(Continued)

*Primary Examiner* — Khaled M Kassim
*Assistant Examiner* — Zhaohui Yang
(74) *Attorney, Agent, or Firm* — Mayer & Williams PC

(57) ABSTRACT

In a 5G or 6G wireless network, a user device that wishes to transmit an uplink message must first transmit a scheduling request to the base station, generally in an allocated time-frequency region sized according to the number of user devices. In general, most of the user devices are not requesting access most of the time, and therefore most of the allocated region is blank. To reduce the amount of wasted resources, the base station can divide the user devices into sections, and allow the user devices to indicate which sections include at least one ready user device. Then, the base station can allocate a much smaller region containing only those indicated sections, and the ready user devices can send their requests in that smaller region. The base station can then determine which user devices request access, provide them with grants, and receive their messages. By avoiding allocating scheduling-request resources to sections that have no waiting messages, the base station may save time and avoid wasting limited resources, according to some embodiments.

12 Claims, 10 Drawing Sheets

(56) References Cited

U.S. PATENT DOCUMENTS

| | | |
|---|---|---|
| 2007/0089037 A1 | 4/2007 | Jiang |
| 2009/0046771 A1 | 2/2009 | Abe |
| 2010/0097939 A1 | 4/2010 | Yoneta |
| 2012/0311409 A1 | 12/2012 | Pedersen |
| 2013/0163656 A1 | 6/2013 | Sakamoto |
| 2013/0346826 A1 | 12/2013 | Zopf |
| 2014/0376358 A1 | 12/2014 | Eder |
| 2015/0139350 A1 | 5/2015 | Sugihara |
| 2016/0080109 A1 | 3/2016 | Lee |
| 2017/0019210 A1 | 1/2017 | Yu |
| 2017/0134193 A1 | 5/2017 | Sugihara |
| 2017/0288912 A1 | 10/2017 | Rahmati |
| 2017/0290031 A1* | 10/2017 | Hwang ............... H04W 72/14 |
| 2017/0311300 A1 | 10/2017 | Stanwood |
| 2019/0281619 A1* | 9/2019 | Lee ................. H04W 72/1268 |
| 2020/0092685 A1* | 3/2020 | Fehrenbach ........... H04W 4/46 |
| 2020/0366409 A1 | 11/2020 | Xu |
| 2020/0394090 A1 | 12/2020 | Urban |
| 2021/0243803 A1* | 8/2021 | Xu ...................... H04W 16/14 |
| 2021/0250049 A1 | 8/2021 | Gabrys |
| 2021/0273651 A1 | 9/2021 | Haftbaradaran |
| 2021/0289539 A1* | 9/2021 | Byun ................... H04L 1/0003 |
| 2021/0328598 A1 | 10/2021 | Annamraju |
| 2021/0383207 A1 | 12/2021 | Beery |

\* cited by examiner

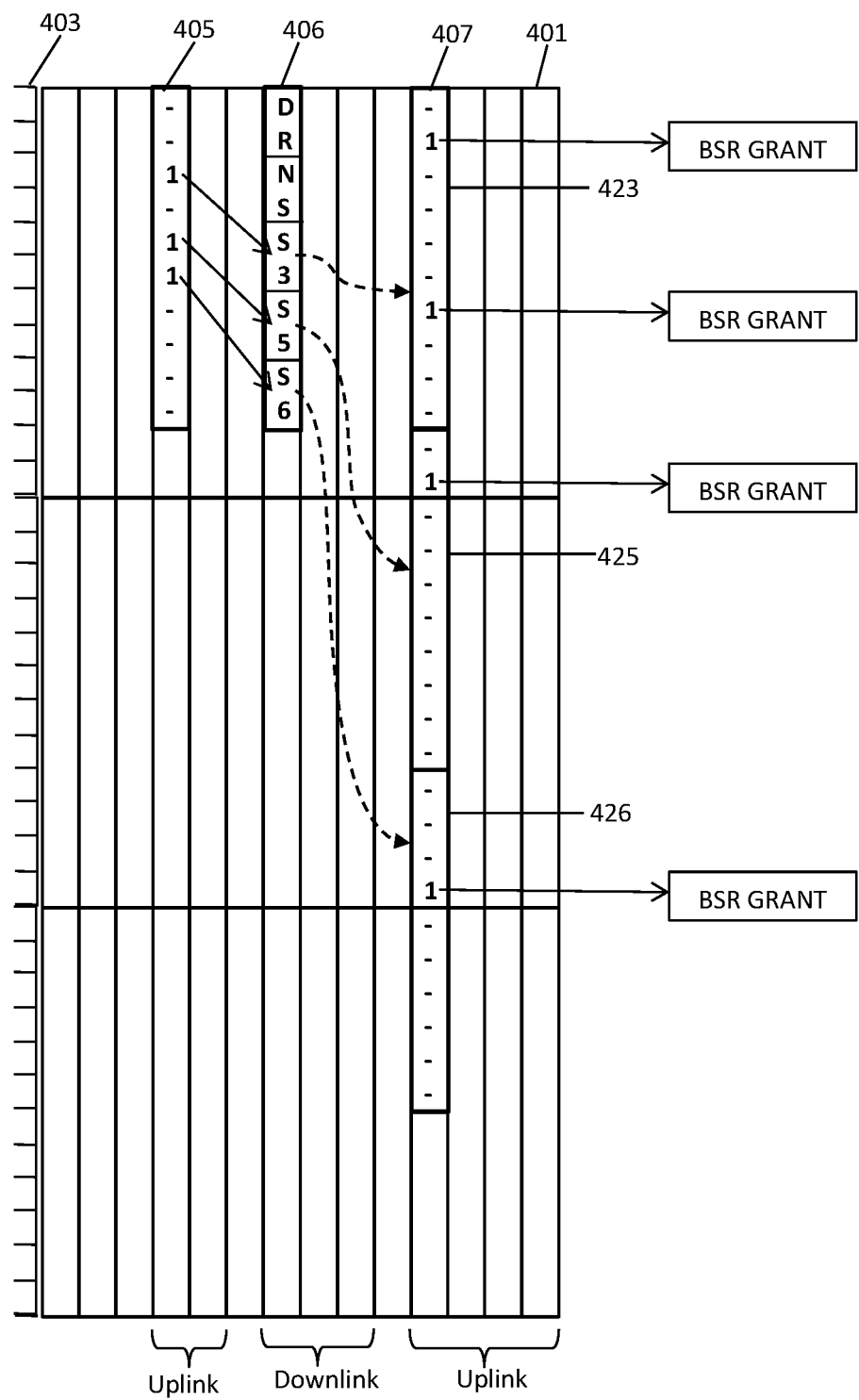

FIG. 4B

450 - A base station assigns each user device to one of a plurality of sections, and to a particular position or address within its section.

451 - On schedule, user devices that wish to upload a message transmit a short signal on a predetermined subcarrier according to the user device's section.

452 - The base station receives the signals, which may be overlapping and interfering if multiple ready users are within a single section. Base station determines which sections have at least one user device wishing to upload.

453 - Base station broadcasts a section message indicating which sections have at least one user device seeking upload. The section message may be modulated for compactness, and may include or be proximate to a demodulation reference.

454 - Base station allocates a user poll region for each ready user to transmit its scheduling request signals. The user poll region includes sufficient resource elements to accommodate all user devices in all of the ready sections. The uplink reply region may be frequency-spanning (in a single symbol-time).

455 - At allocated time, the ready users transmit another short signal in the user poll region, on a particular subcarrier according to the ready user's section and its position in that section.

456 - Base station determines, from the subcarriers of those signals, which user devices seek upload, and transmits a BSR grant to each of them.

457 - User devices transmit BSR messages to base station at granted time.

458 - Base station transmits a message grant to each ready user device..

459 - User devices upload their data messages to base station at granted time.

FIG. 5B

550 - A base station assigns each user device to one of a plurality of sections, and to a particular position or address within that section.

551 - On schedule, user devices that wish to upload a data message transmit a short signal on a predetermined subcarrier according to the user device's section.

552 - The base station receives the signals, which may be overlapping and interfering from multiple user devices within a single section, and determines which sections have at least one user device wishing to upload.

553 - Base station broadcasts a section message indicating which sections have at least one user device seeking upload. The section message may be modulated for compactness, and may include or be proximate to a demodulation reference.

554 - At predetermined time, user devices seeking upload transmit a BSR message on a particular subcarrier according to the sections listed in the section message and the positions of those user devices in their sections.

555 - Base station determines, from the subcarriers of those signals, which user devices seek to upload, and determines from their BSR messages how much resource area they need.

556 - Base station transmits a message grant to each ready user device.

557 - User devices upload their data messages to base station at granted time.

FIG. 6B

650 - A base station assigns each user device to one of a plurality of sections, and to a particular position or section address within that section.

651 - On schedule, high-priority user devices that wish to upload a message transmit a short signal in a pre-assigned exclusive resource region.

652 - After the high-priority resource region, low-priority user devices that wish to upload a message transmit a short signal on a predetermined subcarrier according to the low-priority user device's section.

653 - For each high-priority user device scheduling request, base station provides a BSR grant, receives BSR message, provides message grant, and receives the associated data message.

654 - After all of the high-priority data messages have been uploaded, the base station then broadcasts a section message indicating which sections have at least one low-priority user device seeking upload. The section message may be modulated for compactness, and may include or be proximate to a demodulation reference.

655 - The low-priority user devices seeking upload clearance then transmit a brief signal in a subcarrier and symbol-time according to the section and position of the user device.

655 - Base station detects the low-priority uplink requests, determines which low-priority user devices are requesting service, according to the time and frequency of the signal. Base station issues a BSR grant for each ready device, receives the BSR, issues a message grant, and receives the data message.

CASCADED SCHEDULING REQUESTS FOR RESOURCE-EFFICIENT 5G AND 6G

PRIORITY CLAIMS AND RELATED APPLICATIONS

This application claims the benefit of U.S. Provisional Patent Application Ser. No. 63/170,631, entitled "Rapid Uplink Access by Modulation of 5G Scheduling Requests", filed Apr. 5, 2021, and U.S. Provisional Patent Application Ser. No. 63/170,633, entitled "Rapid Uplink Access by Parallel Signaling on a 5G Random-Access Channel", filed Apr. 5, 2021, and U.S. Provisional Patent Application Ser. No. 63/176,996, entitled "Rapid Uplink Access by Modulation of 5G Scheduling Requests", filed Apr. 20, 2021, and U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/317,177, entitled "Cascaded Polling for Resource-Efficient Low-Complexity 5G/6G DRX", filed Mar. 7, 2022, and U.S. Provisional Patent Application Ser. No. 63/321,879, entitled "Cascaded Scheduling Requests for Resource-Efficient 5G and 6G", filed Mar. 21, 2022, all of which are hereby incorporated by reference in their entireties.

FIELD OF THE INVENTION

The disclosure pertains to uplink scheduling requests, and more particularly to means for reducing resource usage by requesting users.

BACKGROUND OF THE INVENTION

In 5G and 6G, base stations provide resources for user devices to request permission to transmit an uplink message. In a large network, the space necessary to provide each user device with a scheduling request opportunity can be wasteful. What is needed is a way for the user devices to inform the base station that they wish to transmit, while consuming fewer resources.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a base station to communicate in a wireless network comprising a plurality of user devices in signal communication with the base station, the method comprising: allocating the plurality of user devices among integer Ns sections; receiving one or more signals in a first region of a resource grid; determining, from each signal, which one of the sections includes a user device seeking an uplink grant; and receiving further signals in a second region of a resource grid, and determining, from the further signals, which user devices seek uplink grants.

In another aspect, there is a particular user device, of a wireless network comprising a plurality of user devices, the particular user device configured to: receive a particular section number; transmit a first signal in a section poll, the section poll comprising a first plurality of resource elements; receive a section message indicating one or more section numbers comprising at least the particular section number; transmit, responsive to receiving the section message, a second signal in a user poll, the user poll comprising a second plurality of resource elements; and receive an uplink grant.

In another aspect, there is non-transitory computer-readable media in a memory of a base station of a wireless network comprising user devices, the media containing instructions that, when executed by a computing environment, cause a method to be performed, the method comprising: assigning, to each user device, a section number and a position number, respectively; allocating a section poll, comprising a symbol-time and a plurality of subcarriers, for one or more user devices to transmit a first signal, the first signal indicating which sections include at least one user device ready to transmit a data message; allocating a user poll, comprising one or more symbol-times and one or more subcarriers, for user devices to transmit a second signal, the second signal indicating which user devices are ready to transmit a data message, respectively; receiving the second signals and determining therefrom which particular user devices are ready to transmit data messages; and transmitting an uplink grant to each of the particular user devices.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 4A is a schematic showing an exemplary embodiment of a resource grid including frequency-spanning scheduling request messages, according to some embodiments.

FIG. 4B is a flowchart showing an exemplary embodiment of a method for user devices to obtain an uplink grant, according to some embodiments.

FIG. 5B is a flowchart showing an exemplary embodiment of a process for user devices to file scheduling requests with BSR messages, according to some embodiments.

FIG. 6B is a flowchart showing an exemplary embodiment of a process for user devices to provide scheduling requests of low and high priority, according to some embodiments.

Like reference numerals refer to like elements throughout.

DETAILED DESCRIPTION

Figure 1A:
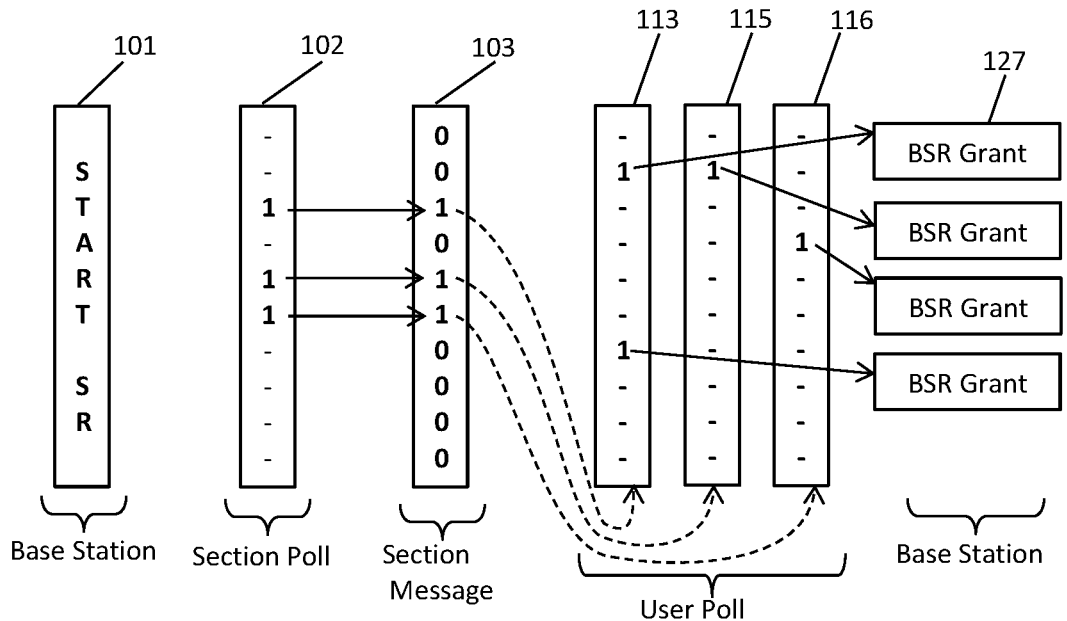
FIG. 1A is a schematic showing an exemplary embodiment of a method for user devices to request an uplink grant in a cascaded manner, according to some embodiments.

Systems and methods disclosed herein (the "systems" and "methods", also occasionally termed "embodiments" or "versions" or "arrangements", generally according to present principles) can provide opportunities for user devices to submit scheduling requests in a cascaded manner, thereby saving time and resources, according to some embodiments. The resource-efficient uplink requests may be performed according to 5G and/or 6G technology. Protocols and standards may be added to 5G and/or 6G to provide the services disclosed herein. One motivation behind the present disclosure may be to provide protocols for user devices to transmit their uplink messages with less resource usage than prior procedures.

According to some embodiments of the disclosed systems and methods, the base station may assign the user devices into "sections", each section having a plurality of user devices therein. For example, there may be Ns sections, each section including up to Nz users per section. The base station may inform each user device of its section number and a "position" or address of the user device within that section. Thus each user device may be identified according to its section number and its position. User devices that are ready to upload a data message and are seeking an uplink grant to do so (the "ready users") may request permission in a cascaded manner. For example, the ready users may first indicate which of the sections includes at least one ready user, and then may identify which of the user devices in those sections are submitting grant requests. Each section that includes at least one ready user may be termed a "ready section" herein. If only a small number of users have a data message ready to transmit and are seeking an uplink grant at a given time, which is usual, then the resource usage may be dramatically reduced by the cascading, since many of the sections are likely to be devoid of ready users. For example, there may be only Nr sections that have a ready user therein, with Nr usually much less than the number of sections Ns. The ready users can request upload grants during an "SR session". (Here and elsewhere, "SR" stands for "scheduling request"). The base station may initiate an SR session with an "SR-start" indicator. The SR-start indicator may be a pre-arranged schedule, or a periodicity such as once per frame, or other formula which the user devices may be informed of (via system information messages or an RRC for example). Alternatively, the indicator may be a specific command by the base station during a scheduled downlink interval. Then, or upon the next scheduled uplink interval, or other allocated time after the SR-start indicator, the ready users may transmit a short signal in a "section poll". The section poll is an allocated region of the resource grid, including a particular symbol-time for user devices to signal that they seek an uplink grant. One subcarrier of the section poll is associated with each section. Thus the subcarriers of the section poll represent the sections of the network, and a signal in a subcarrier of the section poll indicates that at least one of the user devices in that section requests an uplink grant. A ready user in a particular section may thereby indicate that the particular section includes at least one ready user by transmitting the short signal in a particular subcarrier which is assigned to the particular section. The base station can then receive the section poll and determine, from the subcarriers that carry signals, which sections include at least one ready user. Collisions between signals in the section poll may be inconsequential, in some embodiments, if the base station has been configured to treat any received signal in a section poll subcarrier, however distorted, as proof that the corresponding section has at least one ready user.

After determining, from the section poll, which sections include at least one ready user, the base station can then broadcast a "section message" in the next scheduled downlink interval. The section message indicates which sections have at least one ready user in the section poll. (Such sections, that have a ready user, may be termed "ready sections" herein.) The broadcast section message thereby informs the user devices how many ready sections there are, and which sections. In most cases, the ready users do not know this, because they generally cannot receive the section poll at the same time as they transmit their section poll signals; hence the need for the section message.

The base station may allocate a certain region of the resource grid as a "user poll" for the ready users to further identify themselves. The section message may determine the size and shape of the user poll, during which the ready users can transmit a second short scheduling request signal at a particular time and frequency, thereby indicating their desire to upload. More specifically, the user poll may include a number of symbol-times equal to the number of sections that have at least one ready user, and may include a number of subcarriers equal to the number of user devices in each section. Therefore, each ready user has a specific time and frequency allocated for its scheduling request signal. Then, the base station can receive the signals in the user poll, and determine from the time and frequency of each signal, which user device (associated with that time and frequency) is requesting to transmit, and may then provide a grant to those ready users. Usually, most of the sections have no ready users (the "empty" sections, in this context) and are not included in the user poll, thereby avoiding wasting time and resources, according to some embodiments. Examples below clarify this procedure and provide further variations.

In some embodiments, the base station may be able to accept up to N user devices in the network, and may select to allocate $\sqrt{N}$, the square root of N, as the number of sections, and also the number of potential user devices in each section. For example, if the base station can accept 64 registered users, the base station may divide the user devices into 8 sections of 8 user devices each. For a large network of 65536 maximum user devices, the base station may allocate 256 sections of 256 user devices each.

As a further space saving, the base station can subdivide those sections further. For example, the large network of 65536 maximum user devices may be divided into 64 sections, and subdivide each section into 32 subsections, each subsection having 32 user devices. Then the base station may determine, from section polls for example, which subsections include at least one ready user, and may include those subsections in the user poll while ignoring the many blank subsections.

In some embodiments, the base station may have a much smaller number n of currently registered user devices, and may reassign those n current user devices to smaller sections or a smaller number of sections, and a correspondingly smaller number of user devices in each of those smaller sections. Smaller sizes generally occupy a smaller amount of space in the resource grid. Then, if traffic increases and it becomes necessary to use the larger number N, the base station can broadcast a message such as an RRC message instructing the user devices to switch between the two sets of sections.

In some embodiments, the base station may serve high-priority user devices separately from low-priority user devices, such as first providing uplink grants to all of the ready users that are high-priority, and only then returning to the low-priority ready users. For example, the base station may allocate a high-priority user poll in a region of the resource grid, and each high-priority user device may signal its uplink request in its exclusively allocated resource element in the high-priority user poll region.

Terms herein generally follow 3GPP (third generation partnership project) standards, but with clarification where needed to resolve ambiguities. 5G and 6G technologies are designed for "eMBB" (enhanced Mobile Broadband communications), "URLLC" (ultra reliable low latency communications), and "mMTC" (massive machine-type communication) in the "IoT" (internet of things). "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol-time", and a specific frequency and bandwidth termed a "subcarrier" (or "subchannel" in some references). Symbol-times may be termed "OFDM symbols" (Orthogonal Frequency-Division Multiplexing) in references. The time domain may be divided into ten-millisecond frames, one-millisecond subframes, and some number of slots, each slot including 14 symbol-times. The number of slots per subframe ranges from 1 to 8 depending on the "numerology" selected. The frequency axis is divided into "resource blocks" (also termed "resource element groups" or "REG" or "channels" in references) including 12 subcarriers. Each subcarrier is at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol-time in time and a single subcarrier in frequency, is the smallest unit of a message. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Communication in 5G and 6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels may include multiple random access channels in a single cell. "CRC" (cyclic redundancy code) is an error-checking code. "RNTI" (radio network temporary identity) and "C-RNTI" (cell radio network temporary identification) are network-assigned user codes (RNTI and C-RNTI and the other flavors of RNTI are used interchangeably herein). "SNR" (signal-to-noise ratio) and "SINR" (signal-to-interference-and-noise ratio) are used interchangeably unless specifically indicated. "RRC" (radio resource control) is a control-type message from a base station to a user device. "DRX" (discontinuous reception) refers to user devices temporarily entering a "sleep" or idle state to save energy. "H-ARQ" (hybrid automatic repeat request) is a complex procedure for determining when to retransmit a failed message. An "uplink grant" is a grant, transmitted by a base station to a particular user device, permitting the particular user device to upload a BSR message or a data message.

In addition to the 3 GPP terms, the following terms are defined herein. Although in references a modulated resource element of a message may be referred to as a "symbol", this may be confused with the same term for a time interval, among other things. Therefore, each modulated resource element of a message is referred to as a "modulated message resource element", or more simply as a "message element", in examples below. A "demodulation reference" is a set of modulated resource elements that exhibit levels of a modulation scheme (as opposed to conveying data). A "calibration set" is one or more amplitude values, which have been determined according to a demodulation reference, representing the predetermined amplitude levels of a modulation scheme. A "short-form demodulation reference" is a demodulation reference exhibiting the maximum and minimum modulation levels of a modulation scheme, from which a receiver can calculate all of the modulation levels of the modulation scheme. As mentioned, user devices may be allocated to "sections" which are portions of the set of user devices. An "SR-start" is a command or a prearranged time at which an SR session may begin. A "ready user" (having a data message ready to transmit) may transmit a short signal during a "section poll" at a particular subcarrier associated with the ready user's section. The base station can then transmit a "section message" indicating which ready sections include at least one ready user. The number of ready sections then determines the shape of a "user poll" which includes sufficient resource elements to accommodate all of the user devices in the ready sections, such as one symbol-time for each ready section and one subcarrier for each user device in each section. A ready user can then transmit a short uplink scheduling request signal at its assigned time and frequency, thereby prompting uplink grants for uploading the data message. "Cascading" and "cascaded" refer to dividing a set of entities, such as user devices, into sections, determining which sections need service, then determining which user devices in those sections need service, thereby saving time and resources.

Turning now to the figures, the following examples pertain to SR sessions in some embodiments.

FIG. 1A is a schematic showing an exemplary embodiment of a method for user devices to request an uplink grant in a cascaded manner, according to some embodiments. As depicted in this non-limiting example, a base station of a wireless network including a plurality of user devices, can divide those user devices into a plurality of portions or sections, each section including a plurality of user devices. The user devices may be informed of their section number, and their position or address in that section, using a system information message, or during the initial access procedure (such as "Msg4"), or in subsequent user-specific or RRC communications, for example. An SR-start indicator 101 indicates the start of an SR session. The SR-start indicator 101 may be a symbol-time allocated according to a pre-arranged schedule, or a periodicity (such as once per frame or subframe), or a specific command by the base station, for example. Responsive to the SR-start indicator 101, each user device that has a data message ready to upload (and therefore seeks an uplink grant), can then indicate its readiness by transmitting a short signal during a section poll 102. The section poll 102 is a predetermined symbol-time (such as the first symbol-time in the next scheduled uplink interval following the SR-start indicator, for example). The section poll 102 may include a number of subcarriers, equal to the number of sections, so that each ready user can transmit its signal during the subcarrier corresponding to its section number. In the depicted case, user devices transmit signals in the third, fifth, and sixth subcarriers of the section poll 102, thereby indicating that at least one user device in those sections has a data message to upload. The signals in the section poll 102 are indicated by a "1". The other subcarriers, associated with blank sections that have no users currently seeking an uplink grant, are silent and are indicated by a dash "—".

The base station may be configured to interpret any transmitted energy, at the appropriate subcarrier frequencies of the section poll 102, as an indication of readiness in the associated section, and may thereby accommodate collisions among multiple ready users. For example, if multiple user devices in the same section are ready with data messages, they will transmit their signals simultaneously, causing a collision. The base station may therefore broadly accept energy transmitted on each subcarrier as an indication that at least one user device in that section seeks an uplink grant. Since most user devices cannot receive at the same time as they transmit, the user devices may not know which sections are ready. Therefore, the base station may broadcast a "section message" 103 summarizing the information in the section poll 102. In this case, the section message 103 is a repetition of the section poll 102, but with the blank or no-signal subcarriers now replaced by a "0" transmission, while the subcarriers that have ready users are indicated by a "1". The 0-1 symbols stand for two modulations, such as the two modulations of BPSK, for example. In another embodiment, the base station may leave the no-signal subcarriers blank instead of transmitting the "0" modulation state. In either case, or other format, the ready users can receive the section message 103 and thereby determine how many sections include ready users, and which sections.

The base station may allocate a "user poll" for ready users to submit their scheduling request signals. The user poll may include a number of subcarriers and a number of symbol-times in the next scheduled uplink interval following the section message 103, for example. The number of symbol-times in the user poll may equal the number of ready sections, as indicated in the section message 103, and the number of subcarriers in the user poll may equal the number of user devices in each section, according to some embodiments. Each ready user can then transmit a scheduling request, which in this case is a short signal in the symbol-time corresponding to its section number and at the subcarrier frequency corresponding to its position in that section. In the depicted case, the user poll includes three symbol-times 113, 115, 116 corresponding to the three non-zero entries in the section message 103 at positions three, five, and six as suggested by curvy arrows. In addition, each of the user poll symbol-times 113, 115, 116 has ten subcarriers corresponding to ten user devices per section. As with the section poll, the signals of ready users are indicated by a 1, and the blank or no-signal subcarriers by a dash. The user poll is contention-free because each user device is allocated a specific symbol-time (according to its section number) and a specific subcarrier (according to its position in the section) for its scheduling request signal. In the depicted case, the first user poll symbol-time 113 includes two ready users at positions two and seven, the second symbol-time 115 has a ready user at position two, and the third one has a ready user at position four, as indicated by the 1's in those positions.

The base station can then receive the signals in the user poll, determine which user devices request uplink grants, and then transmit a "BSR grant" 127 to each ready user. A BSR grant is a grant to transmit a BSR message. The user device then transmits its BSR message indicating the size of the data message. The base station can then provide a "message grant" permitting the ready user to upload its data message.

In summary, the SR-start indicator 101 prompts the ready users to transmit a short signal at their section subcarriers in a section poll 102, which the base station replicates as the section message 103 indicating which sections have ready users. Those user devices then transmit a short scheduling request at their positions in the assigned section of the user poll, which enables the base station to determine which user devices request grants. Importantly, the other sections, having no ready users, are not included in the user poll, thereby saving time and resources.

Figure 1B:
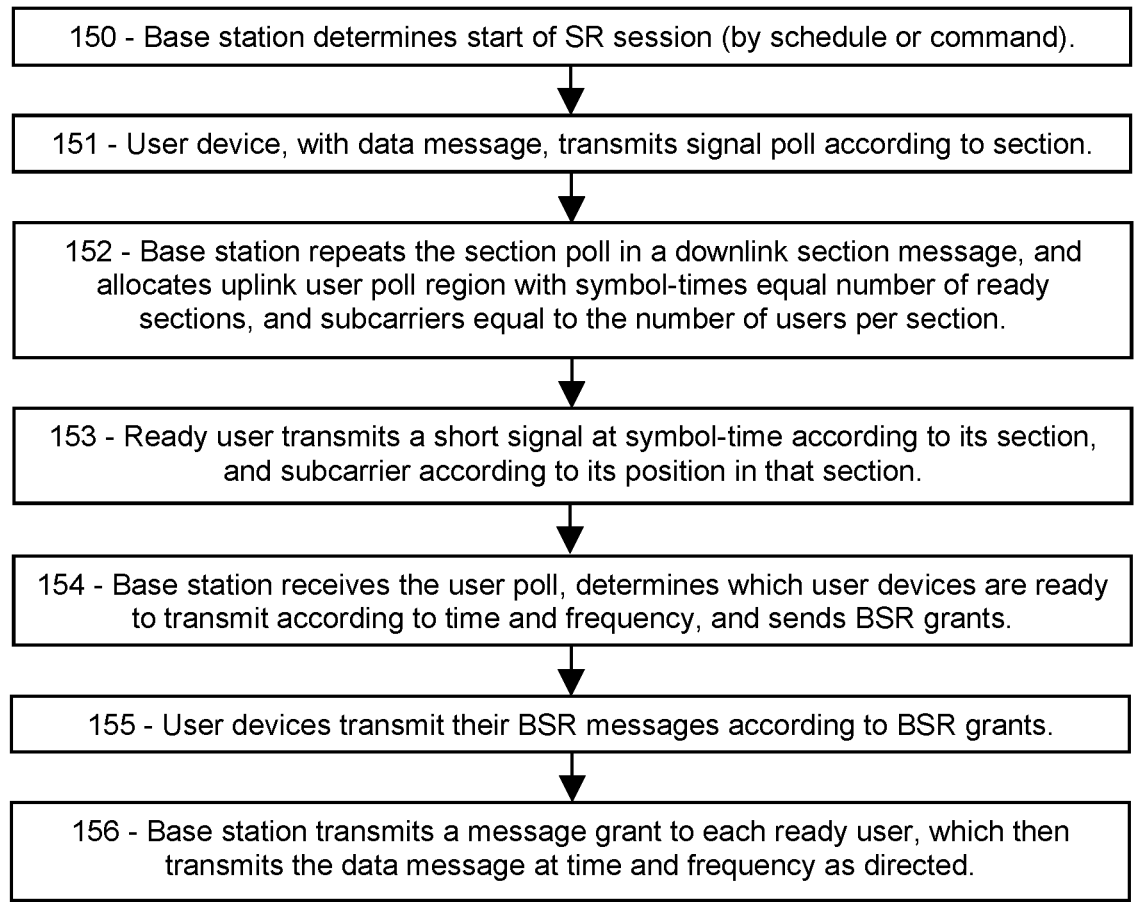
FIG. 1B is a flowchart showing an exemplary embodiment of a method for user devices to request an uplink grant in a cascaded manner, according to some embodiments.

FIG. 1B is a flowchart showing an exemplary embodiment of a method for user devices to request an uplink grant in a cascaded manner, according to some embodiments. As depicted in this non-limiting example, at 150 a base station may arrange a schedule for SR sessions, or broadcast a command initiating the SR session, for example. At 151, a ready user, which belongs to a particular section, transmits a signal in a section poll, at a subcarrier corresponding to the particular section, thereby indicating that its section includes at least one user device that has a data message ready to upload. At 152, the base station reads the section poll, determines which sections include a ready user according to the subcarriers that have signal energy, and then broadcasts a section message that includes the same information. In this case, the section message is a repeat of the section poll, thereby indicating the same sections as the section poll.

At 153, each ready user receives the section message and thereby determines how many sections, and which sections, will be represented in the user poll. The ready user then transmits a short signal, serving as its scheduling request, in the user poll. Specifically, the ready user transmits the signal at a symbol-time corresponding to the ready user's section, and at a subcarrier corresponding to its position in the section, in this embodiment.

At 154, the base station receives the signals in the user poll and, based on the signals and their times and frequencies, determines which user devices have data messages to send. The base station then transmits a BSR grant to each of them. At 155 the user devices transmit their BSR messages, receive a message grant at 156, and then upload their data messages.

The following examples pertain to SR sessions in which the section message is configured as a series of section numbers instead of 1's and 0's.

Figure 2A:
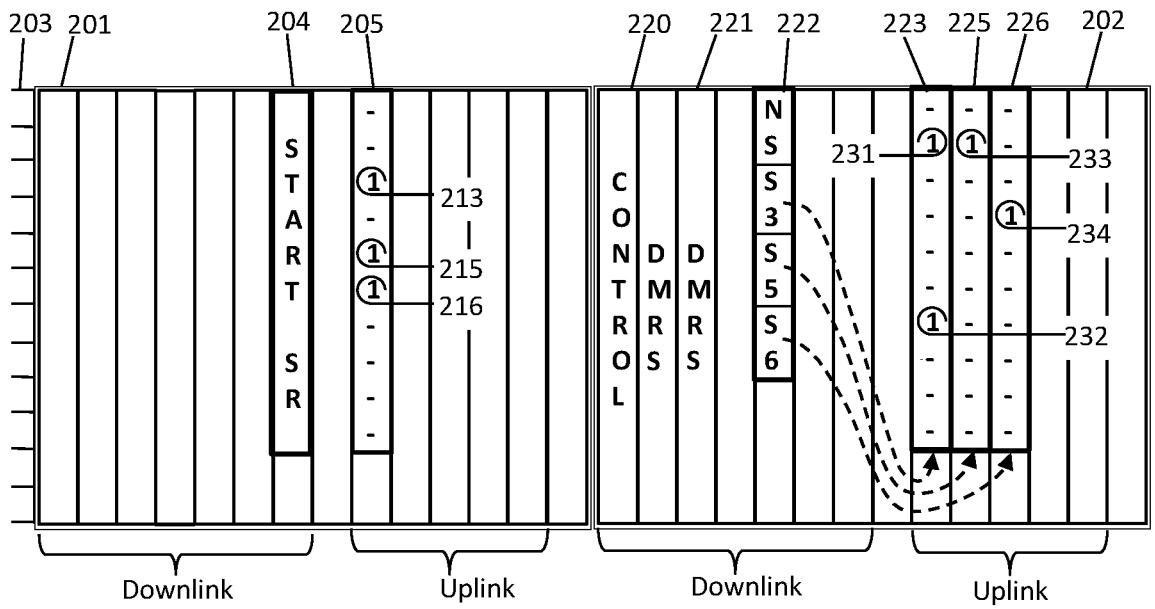
FIG. 2A is a schematic showing an exemplary embodiment of a resource grid populated with control and scheduling request messages, according to some embodiments.

FIG. 2A is a schematic showing an exemplary embodiment of a resource grid populated with control and scheduling request messages, according to some embodiments. As depicted in this non-limiting example, a resource grid includes a first slot 201 and a second slot 202, with 12 subcarriers 203 as marked, and 14 symbol-times per slot. Scheduled uplink and downlink intervals are indicated. The base station can assign each user device to one of several sections and to a particular position within that section. In the depicted case, there are ten sections, and each section has ten user devices per section. Hence the section poll 102 has ten subcarrier positions, and the user poll also occupies 10 subcarriers.

During a downlink interval, the base station transmits a Start-SR message 204, thereby initiating an SR session. In other embodiments, the SR sessions may be initiated automatically, according to a schedule or periodically or otherwise. The ready users that have data messages to send can transmit a short signal during an allocated section poll 205, which is a symbol-time during a scheduled uplink interval. The section poll includes sufficient subcarriers to have one subcarrier per section, in this case 10 subcarriers. Three signals 213, 215, 216 appear in the section poll, indicating that sections three, five, and six include at least one ready user. The other positions of the section poll are blank (no transmission).

The base station then broadcasts downlink control information 220 and a DMRS demodulation reference 221 in a scheduled downlink interval, followed by a section message 222. In this case, instead of replicating the section poll 205, the section message provides section numbers explicitly. For example, the section message may be modulated in 16QAM. The section message 222 includes "NS" the number of ready sections (three in this case), followed by the section numbers of the ready sections "S3", "S5", "S6". In some cases, the section message 222 formatted in this way may take up less resource area than replicating the section poll, especially for large networks and/or networks composed mainly of user devices that rarely transmit, such as alarms.

The user devices can then receive the DMRS 221 and update the demodulation levels (such as amplitude and phase levels), which enables demodulation of subsequent messages. The user devices can then receive and demodulate the section message 222, and thereby determine that sections 3, 5, and 6 include ready users. The base station may allocate three symbol-times to the user poll, specifically regions 223, 225, 226 in which the user devices can transmit their scheduling request signals. The user poll regions 223, 225, 226 thereby correspond to the three section numbers listed in the section message 222, as suggested by curvy arrows. Ready users in section 3 can then transmit short signals in the corresponding section of the user poll 223, and likewise for ready users in sections 5 and 6. In this example, section 3 has two user devices waiting to transmit data messages, and therefore two signals 231 and 232 appear in the user poll symbol-time 223 corresponding to section 3. Sections 5 and 6 each have one ready user, and so region 225 has one signal 233. Likewise, region 226 has one signal 234 showing. The other positions of the user poll regions 223, 225, 226 are blank. The base station can then determine which user devices request uplink grants based on which section and which subcarrier they transmit in, and can provide BSR grants and message grants to the four ready users that transmitted the reply signals 231, 232, 233, 234.

Figure 2B:
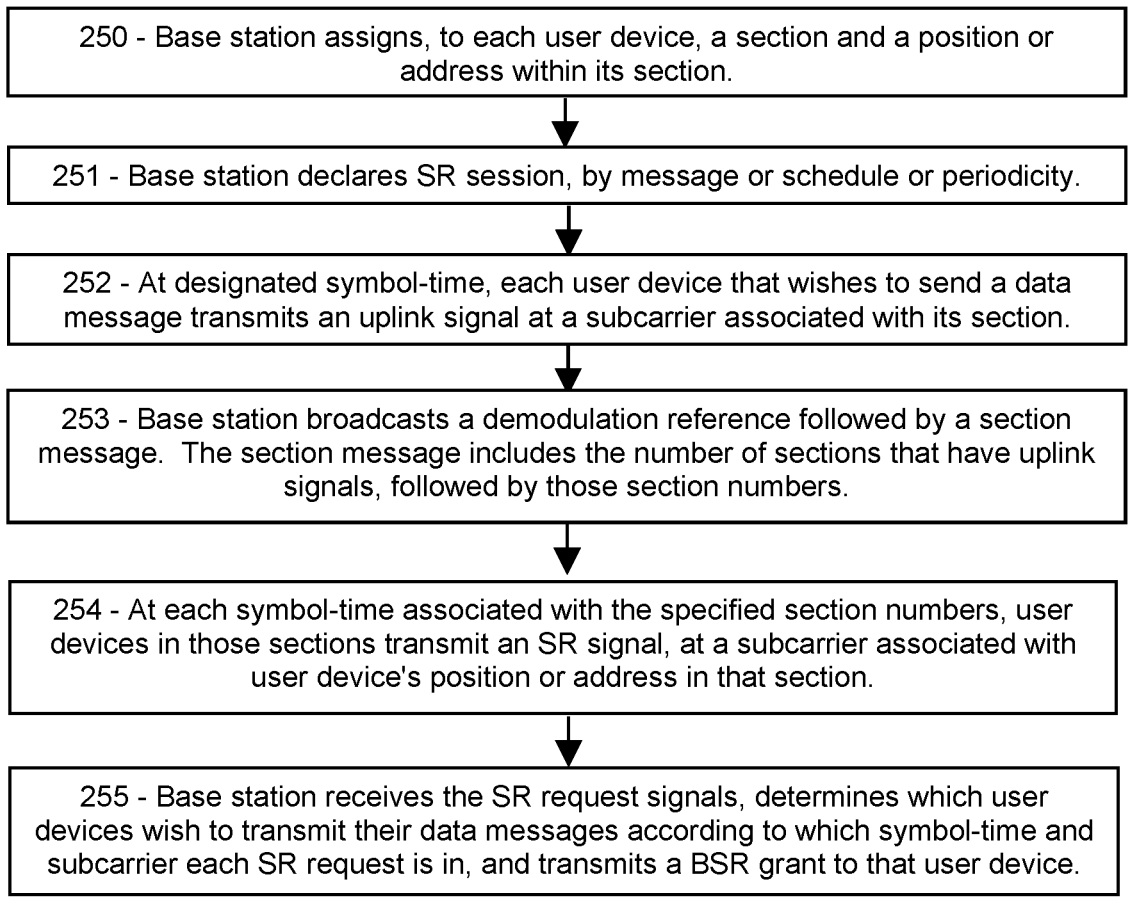
FIG. 2B is a flowchart showing an exemplary embodiment of a method for user devices to deliver scheduling request messages, according to some embodiments.

FIG. 2B is a flowchart showing an exemplary embodiment of a method for user devices to deliver scheduling request messages, according to some embodiments. As depicted in this non-limiting example, at 250 a base station assigns each user device in a network to a section, and to a particular position or address within that section, respectively. At 251, the base station initiates an SR session in which user devices can indicate their readiness to upload a data message. The base station may provide a schedule of SR session times, or a periodicity between sessions, or may broadcast a message declaring the session, for example. At 252, each ready user can transmit a short signal in a section poll at an allocated symbol-time, each user device transmitting on a subcarrier of the section poll corresponding to the user device's section number.

At 253, the base station can receive the section poll and determine, from the frequencies of the signals, which sections include at least one user device waiting to transmit a data message. At 254, the base station broadcasts a section message that replicates, or summarizes, the information from the section poll, such as indicating which sections include at least one ready user.

At 254, each ready user can determine, from the section message, how many sections include ready users, and which sections they are. Accordingly, each ready user can locate its allocated symbol-time and subcarrier in a subsequent user poll region. The ready user can then transmit a short scheduling request signal at that time and frequency. For example, the symbol-time of the scheduling request signal may correspond to the section number of the ready user, and the subcarrier of the scheduling request signal may correspond to the position of the ready user in that section. There is no contention or collision between user devices in the user poll reply region because each user device has a separate resource element. Accordingly, the identity of each ready user is uniquely determined by the time and frequency of its request signal.

At 255, the base station can determine, from the time and frequency of each signal during the allocated user poll region, which user devices request upload permission, and can provide BSR and data message grants to those user devices accordingly.

The following examples pertain to SR sessions in which the ready users can indicate, in their grant requests, the size of the planned uplink message.

Figure 3A:
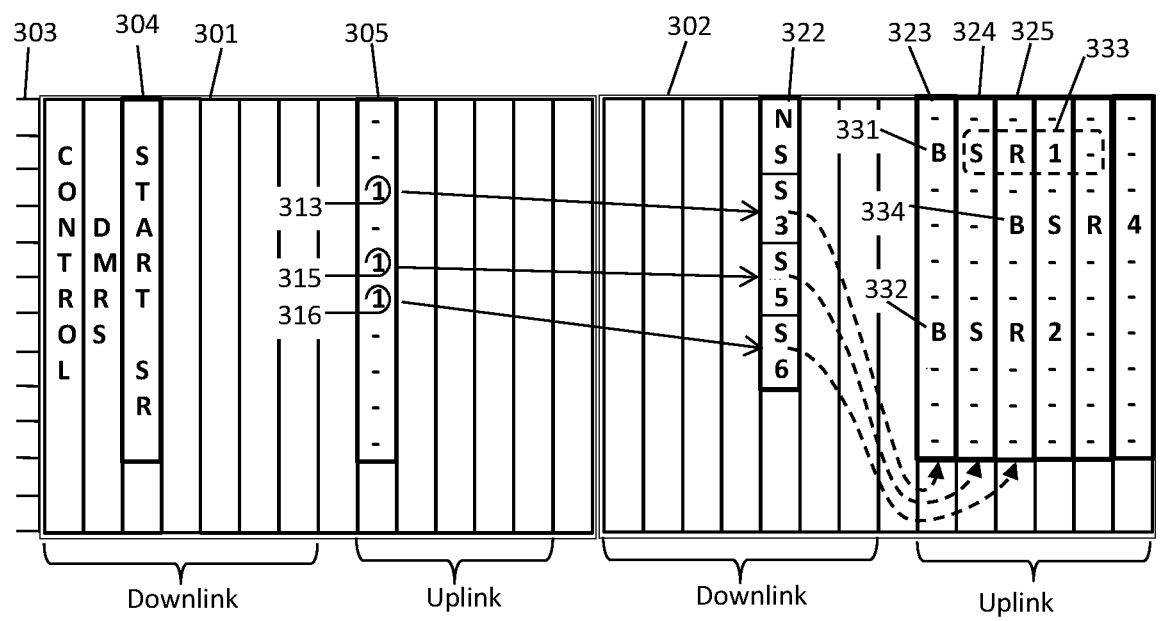
FIG. 3A is a schematic showing an exemplary embodiment of a resource grid including scheduling requests and BSR messages, according to some embodiments.

FIG. 3A is a schematic showing an exemplary embodiment of a resource grid including scheduling requests and BSR messages, according to some embodiments. A network base station has assigned user devices to a number of sections. As depicted in this non-limiting example, a resource grid includes a first and second slots 301, 302 with subcarriers 303. Various downlink control messages and DMRS are shown, followed by a modulated SR start indicator 304 initiating an SR session. Accordingly, in the first symbol-time of the next scheduled uplink interval, a section poll 305 is allocated for user devices to transmit short signals indicating their readiness to upload data messages. Each subcarrier of the section poll 305 is associated with one of the sections, respectively, and the ready users can transmit their signals in the subcarrier associated with their section. In this case, three signals 313, 315, 316 indicate that sections 3, 5, 6 include at least one waiting data message.

The base station receives the section poll 305 and, in the next scheduled downlink interval, broadcasts a section message 322 indicating the number of ready sections and their section numbers as shown. The base station allocates a user poll region in the next scheduled uplink interval as indicated by curvy arrows, with subcarriers equal to the number of user devices in a section, and a number of symbol-times equal to the number of ready sections plus three, that is, six symbol-times. The extra symbol-times are to accommodate BSR messages.

The ready users can receive the section message 322 and can transmit a BSR message in the allocated user poll region, starting in the symbol-time 323, 324, 325 associated with their section (first symbol-time for the first-named section in the section message, and so forth). The BSR is an 8-bit message indicating the size of the data message. The BSR occupies four resource elements when modulated in QPSK. Each ready user transmits its BSR message time-spanning, starting in the symbol-time associated with its section, and extending through four successive symbol-times. However, the ready users are not permitted to transmit a BSR message if its subcarrier is already occupied by another BSR message, to avoid collisions. In that case, the later user device must wait until the next SR session, or take other action to obtain uplink permission.

Section 3 includes two ready users in this case, residing in positions 2 and 7 of the third section. Accordingly, the first ready user transmits its BSR message 331 on the second subcarrier starting in the first symbol-time 323 of the user poll region, and continuing for the next three symbol-times, as shown by "BSR1". The second ready user, which is also in the same section at position 7, transmits its BSR2 message 332 starting in the same symbol-time 323 in subcarrier 7 according to its position in the section.

A third ready user is in section 5 at position 2. Therefore, the third ready user would like to transmit its BSR message starting in the second symbol-time 324 (corresponding to section 5), at the second subcarrier (corresponding to the second position in the section). However, the second subcarrier is already occupied by the first BSR message 331 which is in progress from the first ready user. Therefore, the third ready user cannot transmit, as indicated by a dashed shape 333. (The third ready user may try again upon the next SR session, or it may initiate a random access procedure to gain access more quickly, or the base station may allocate additional symbol-times for users to avoid being blocked out, or the base station may allocate subsequent resources by which a blocked-out ready user may transmit a message identifying the blocked-out ready user, specifying the data message size, and requesting a grant.)

A fourth ready user is in section 6 at position 4. Since section 6 corresponds to the third symbol-time 325, the fourth ready user transmits its BSR message 334 BSR4 as shown.

The base station can then receive the signals in the user poll region, demodulate the BSR messages (without a demodulation reference, since they are in QPK which does not include amplitude modulation), and can thereby determine from the BSR messages how much resources are needed to upload each of the ready data messages (other than the third user device, which was blocked in this example).

Figure 3B:
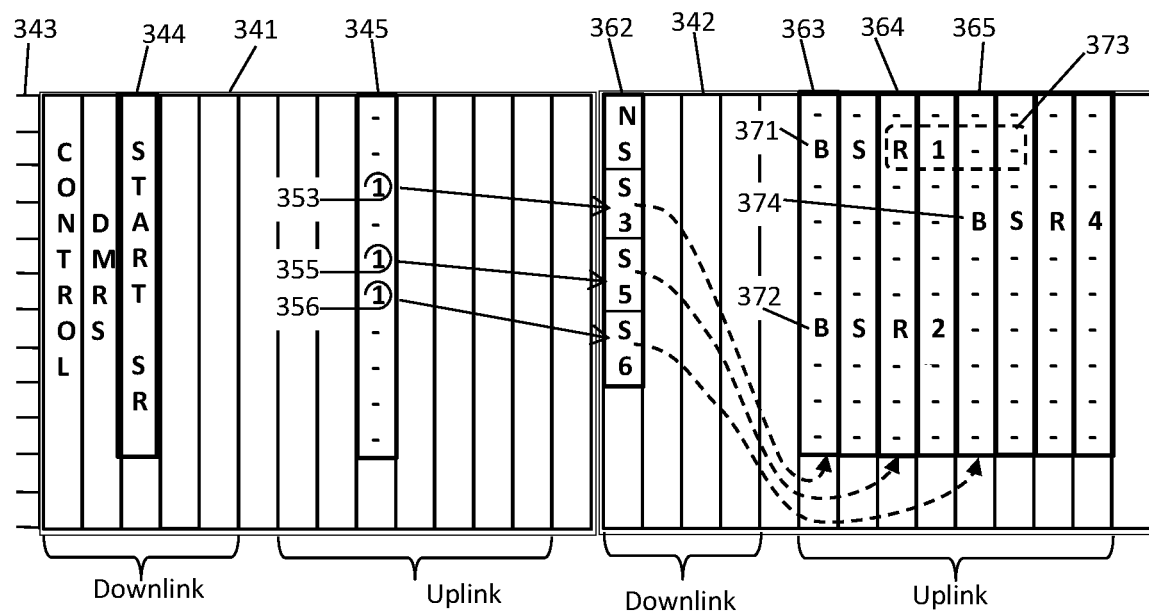
FIG. 3B is a schematic showing another exemplary embodiment of a resource grid including scheduling requests and BSR messages, according to some embodiments.

FIG. 3B is a schematic showing another exemplary embodiment of a resource grid including scheduling requests and BSR messages, according to some embodiments. In contrast to the previous example, in this case extra symbol-times are allocated in the user poll region to accommodate user devices that cannot switch from receive mode to transmit mode quickly. As depicted in this non-limiting example, a resource grid includes first and second slots 341, 342 with subcarriers 343. Various downlink control messages and DMRS (not labeled) are shown, followed by a modulated Start-SR indicator 344 initiating an SR session. Accordingly, in the first symbol-time of the next scheduled uplink interval, a section poll 345 is allocated for user devices to transmit short signals indicating their readiness to upload data messages. Each subcarrier of the section poll 305 is associated with one of the sections, respectively, and the ready users can transmit their signals in the subcarrier associated with their section. In this case, three signals 353, 355, 356 indicate that sections 3, 5, 6 include at least one waiting data message.

The base station receives the section poll 345 and, in the next scheduled downlink interval, broadcasts a section message 362 indicating the number of ready sections and their section numbers as shown. The base station allocates a user poll region in the next scheduled uplink interval as indicated by curvy arrows, with subcarriers equal to the number of user devices in a section, and a number of symbol-times. In this case, the number of symbol-times in the user poll equals to the number of ready sections times two, plus two, that is, eight symbol-times. The extra symbol-times are to accommodate BSR messages and to accommodate user devices that cannot switch from receive mode to transmit mode in a single symbol-time. Those user devices may therefore need an extra symbol-time between detection of potential interference and starting their transmission.

The ready users can receive the section message 362 and can transmit a BSR message in the allocated user poll region, starting in the symbol-time 363, 364, 365 associated with their section (first symbol-time for the first-named section in the section message, and so forth). The BSR is an 8-bit message indicating the size of the data message and occupying four resource elements when modulated in QPSK. Each ready user transmits its BSR message time-spanning, starting in the symbol-time associated with their section and extending through four successive symbol-times. However, the ready users are not permitted to transmit a BSR message if the subcarrier is already occupied by another BSR message, to avoid collisions. To accommodate user devices that cannot switch rapidly between receive and transmit modes, an extra symbol-time is allocated between each successive section's starting region. Although this increases the amount of resources required for the user poll, it may avoid collision between BSR messages, especially when reduced-capability user devices are involved.

Section 3 includes two ready users in this case, residing in positions 2 and 7 of the third section. Accordingly, the first ready user transmits its BSR message 371 on the second subcarrier starting in the first symbol-time 363 of the SR-reply region and continuing for the next three symbol-times, as shown by "BSR1". The second ready user, which is also in the same section at position 7, transmits its BSR2 message 372 starting in the same symbol-time 363 (since it is in the same section), but in subcarrier seven according to its position in the section.

A third ready user is in section 5 at position 2. Therefore, the third ready user would like to transmit its BSR message starting in the third symbol-time 364 (corresponding to section 5, and including the extra symbol-time between the symbol-times associated with the third and fifth section 363, 364), at the second subcarrier (corresponding to the second position in the section). However, even with the extra symbol-time, the second subcarrier is still occupied by the first BSR message 371 which is in progress from the first ready user. Therefore the third ready user cannot transmit, as indicated by a dashed shape 373. The third ready user may try again upon the next SR session. Alternatively, in some embodiments, the third ready user may initiate a random access procedure to gain access more quickly. In yet another embodiment, the base station may allocate additional symbol-times for the BSR messages to avoid ready users from being blocked out. In yet another embodiment, the base station may allocate subsequent resources by which a blocked-out ready user may transmit a message identifying the blocked-out ready user, specifying the data message size, and requesting a grant.

A fourth ready user is in section 6 at position 4. Since section 6 corresponds to the third symbol-time 365, the fourth ready user transmits its BSR message 374 BSR4 as shown.

The base station can then receive the signals in the user poll region, demodulate the BSR messages (without a demodulation reference, since they are in QPK which does not include amplitude modulation), and thereby determine from the BSR messages how much resources to grant to each of the ready users.

Figure 3C:
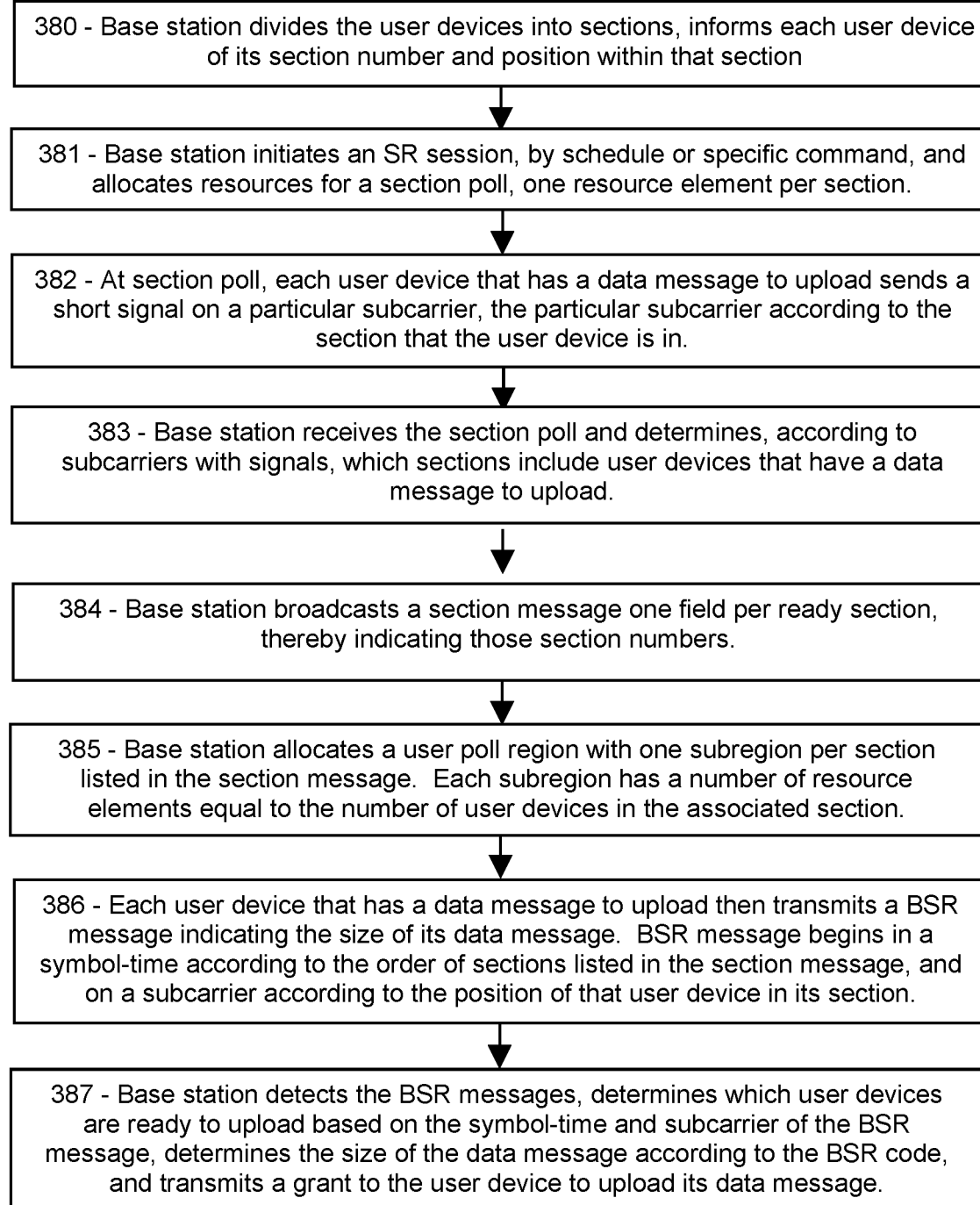
FIG. 3C is a flowchart showing an exemplary embodiment of a process for user devices to transmit scheduling requests including BSR messages, according to some embodiments.

FIG. 3C is a flowchart showing an exemplary embodiment of a process for user devices to transmit scheduling requests including BSR messages, according to some embodiments. As depicted in this non-limiting example, at 380 a base station divides the user devices of a network into sections and informs each user device of its section number and its position in that section. At 381, the base station initiates an SR session using, for example, a message or command, a network-specified schedule, a predetermined periodicity, or otherwise. The base station also allocates resources for a section poll in which each user device with a data message ready to send can indicate which section it is in.

At 382, each ready user transmits a short signal at a symbol-time of the section poll and at a subcarrier frequency corresponding to the ready user's section number. User devices that do not have a message to upload remain silent. At 383, the base station receives the section poll, and determines which sections include at least one user device with a data message to send. The base station may be configured to have a very wide acceptance as to the type and modulation of the signals, since in some cases the signals may be collided due to multiple ready users in a single section.

At 384, the base station broadcasts a section message repeating the information of the section poll so that the ready users, which may not be able to receive the section poll, can determine which sections include ready users. The section message may be a copy of the section poll, or it may include a list of the ready sections. At 385, the base station allocates an uplink user poll region including one resource element for each user device in each of the ready sections. For example, the base station can allocate a number of symbol-times equal to the number of ready sections in the section message plus three (to accommodate the BSR messages), and a number of subcarriers equal to the current number (or the maximum number) of user devices in each section.

At 386, each ready user transmits a BSR message indicating the size of the data message. The BSR message may start in a symbol-time associated with the section of the ready user, and may occupy a subcarrier corresponding to the ready user's position in that section. The BSR message may thereby be time-spanning. At 387, the base station receives the BSR messages, determines according to the time and frequency which user devices request grants, and then downloads message grants to those ready users to transmit their data messages.

The following examples pertain to SR sessions in which the user poll region is confined to a single symbol-time.

FIG. 4A is a schematic showing an exemplary embodiment of a resource grid including a frequency-spanning user poll region, according to some embodiments. As depicted in this non-limiting example, a base station may allocate a user poll region all in a single symbol-time, for faster responses. As in previous examples, the base station divides the user devices among several sections and initiates an SR session. The figure depicts a resource grid 401 with subcarriers 403 and an allocated section poll 405 in which the ready users have inserted signals at positions corresponding to their section numbers. Then the base station broadcasts a section message 406 including, in this embodiment, a short-form demodulation reference "DR", the number of ready sections "NS", and those section numbers "S3, S5, S6". The base station then allocates a user poll region 407 which, in this embodiment, is frequency-spanning in a single symbol-time for all three sections 423, 425, 426. Thus the subcarrier of each signal in the user poll region 407 indicates both the section number and the position of the user device in its section. The base station can then determine which user device transmitted which signal in the user poll region 407, and may provide a BSR grant to each user device for subsequent uploading.

FIG. 4B is a flowchart showing an exemplary embodiment of a method for user devices to obtain an uplink grant, according to some embodiments. As depicted in this non-limiting example, at 450 a base station assigns user devices to sections and informs each user device of its address or position in that section. At 451, in an allocated section poll, each ready user transmits a short signal in the section poll at a subcarrier corresponding to the ready user's section. At 452, the base station receives the section poll and determines which sections have at least one ready user. At 453, the base station broadcasts a section message listing the ready sections. A 454, the base station allocates a frequency-spanning region for the ready users to transmit their scheduling requests, with enough resource elements to equal the user devices in all of the ready sections. At 455, the ready users transmit a short signal in the uplink user poll region at a subcarrier according to the ready user's section and position in that section. At 456, the base station determines which user devices request access and transmits a BSR grant to each of them. At 457, the ready users upload their BSR messages. At 458, the base station provides a message grant, and at 459 the ready users transmit their data messages.

The following examples pertain to SR sessions in which the ready users can submit BSR messages as the uplink grant requests.

Figure 5A:
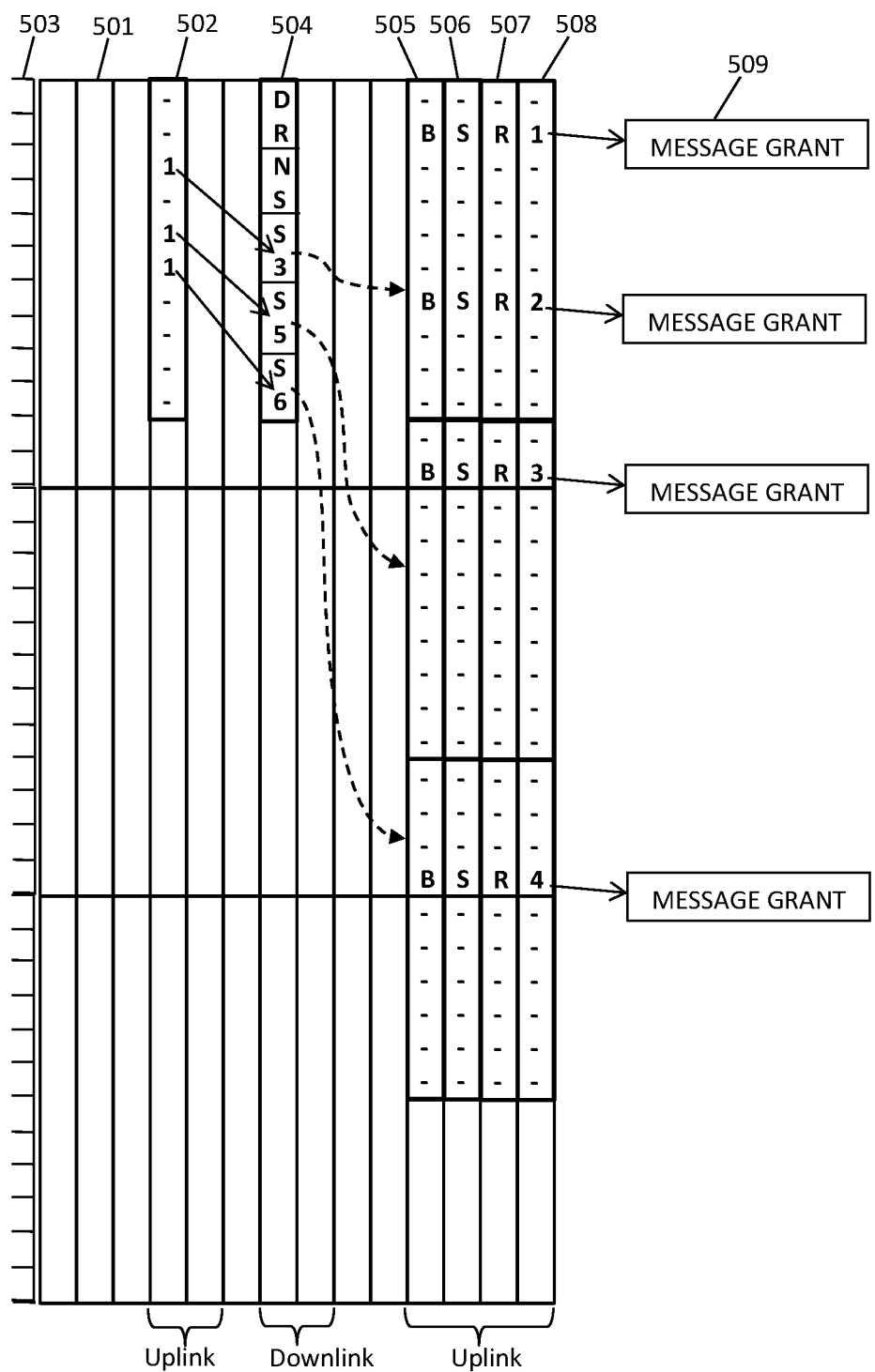
FIG. 5A is a schematic showing an exemplary embodiment of a resource grid including scheduling requests in a frequency-spanning configuration with BSR messages, according to some embodiments.

FIG. 5A is a schematic showing an exemplary embodiment of a resource grid including scheduling requests in a frequency-spanning configuration with BSR messages, according to some embodiments. As depicted in this non-limiting example, a base station may allocate a user poll region with a number of subcarriers equal to the number of user devices in all of the ready sections, and a number of symbol-times equal to the length of a time-spanning BSR message (four symbol-times in QPSK). As in previous examples, the base station divides the user devices among several sections and initiates an SR session. The figure depicts a resource grid 501 with subcarriers 503 and an allocated section poll 502 in which the ready users have inserted signals at positions corresponding to their section numbers. Then the base station broadcasts a section message 504 including, in this embodiment, a short-form demodulation reference "DR", the number of ready sections "NS", and those section numbers "S3, S5, S6". The base station then allocates a user poll region which, in this embodiment, is a rectangular region, with the ready sections frequency-spanning and the BSR messages time-spanning across symbol-times 505, 506, 507, 508. Thus the subcarrier of each BSR message in the user poll indicates both the section number and the position of the user device in its section. The base station can then determine which user device transmitted which BSR message in the uplink reply region 507, and may provide a message grant 509 to each user device for subsequent uploading of the data message.

FIG. 5B is a flowchart showing an exemplary embodiment of a process for user devices to file scheduling requests with BSR messages, according to some embodiments. As depicted in this non-limiting example, at 550 a base station assigns user devices to sections and informs each user device of its address or position in that section. At 551, in an allocated section poll, each ready user transmits a short signal in the section poll at a subcarrier corresponding to the ready user's section. At 552, the base station receives the section poll and determines which sections have at least one ready user. At 553, the base station broadcasts a section message listing the ready sections. Base station allocates a rectangular region of the resource grid for the ready users to transmit their BSR messages indicating how large the data messages are. The region has subcarriers equal to the user devices in all of the ready sections, and symbol-times equal to the length of a BSR message. At 554, the ready users transmit their BSR messages in the uplink reply region, at a subcarrier according to the ready user's section and position in that section. At 555, the base station determines which user devices request access and how much space they need. At 556, the base station provides a message grant, and at 557 the ready users transmit their data messages.

The following examples pertain to SR sessions in which high-priority user devices receive uplink service ahead of the lower-priority user devices.

Figure 6A:
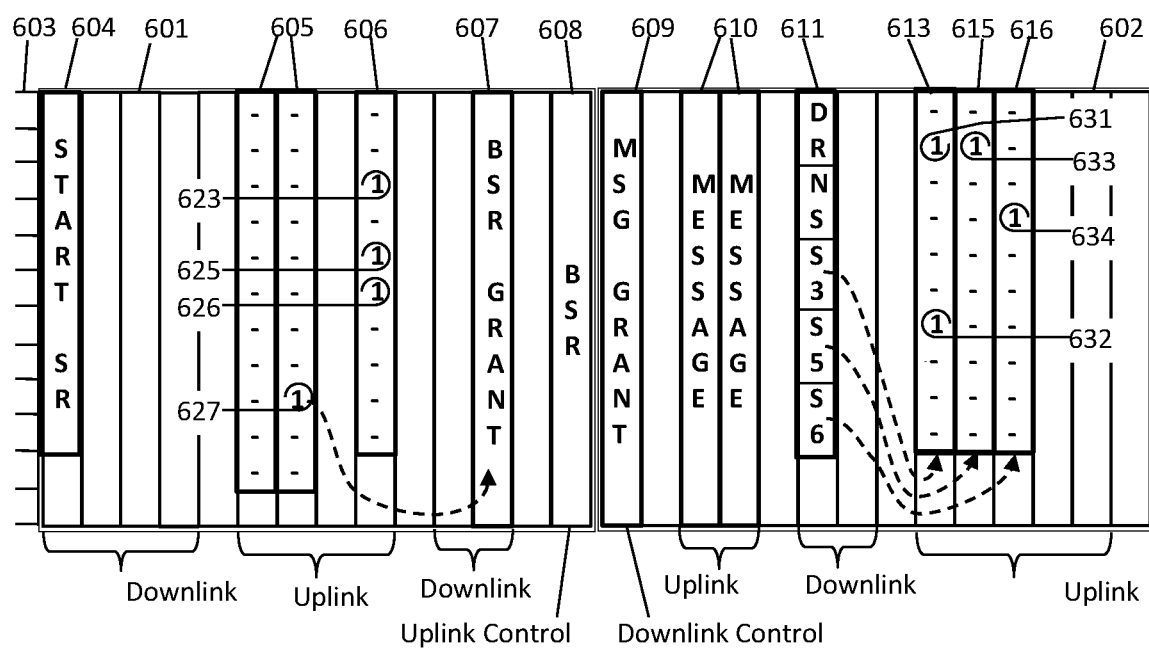
FIG. 6A is a schematic showing an exemplary embodiment of a resource grid including high and low priority scheduling requests, according to some embodiments.

FIG. 6A is a schematic showing an exemplary embodiment of a resource grid including high and low priority scheduling requests, according to some embodiments. As depicted in this non-limiting example, a resource grid with a first and second slot 601, 602 and subcarriers 603 includes an SR-start command 604 prompting ready users to transmit a short signal indicating readiness to upload a data message. However, in this example, the base station allocates a high-priority user poll 605 for high-priority user devices, before the section poll 606 for low-priority user devices. The high-priority user poll 605 provides one resource element for each high-priority user device. The high-priority user poll 605 is not cascaded and does not use sections, in this embodiment. For example, a high-priority user may be a user with high default QoS demands.

Each high-priority user that has been assigned one of the resource elements of the high-priority user poll 605 then transmits a short signal on its allocated subcarrier and symbol-time. In the depicted case, one high-priority user device 627 transmits a signal on its allocated resource element as shown.

The low-priority user devices can then insert short signals in the section poll 606, at a subcarrier according to the low-priority user device's section number. In this case, three sections (the third, fifth, and sixth sections) include signals 623, 625, 626 thereby indicating that those sections include at least one ready user.

Instead of serving the low-priority user devices, in this case, the base station first attends to the single high-priority user device 627, as indicated by a curvy dashed arrow. The base station transmits a BSR grant 607 to the high-priority user device 627, and in the next uplink scheduled interval (which is the uplink control symbol-time in this case), the high-priority user device 627 transmits its BSR message 608. The base station then provides a message grant 609 in the downlink control symbol-time, and the high-priority user device then transmits its data message 610.

The base station can then return to the low-priority user devices. In a scheduled downlink interval, the base station transmits a section message 611 which includes a short-form demodulation reference DR (if not already provided elsewhere), the number of ready sections NS, and those section numbers S3 etc. The user devices can then transmit short scheduling requests on allocated symbol-times 613, 615, 616 according to the section number, and on a subcarrier according to the ready user's position in its section. In this case, four ready users transmitted scheduling requests 631, 632, 633, 634.

Not shown, but probably desirable, are demodulation references in the two slots to enable reliable demodulation of the BSR grant 607 and the message 610. Not shown, but probably necessary, are resources for an acknowledgement download to the high-priority user device indicating reception or otherwise of its data message 610. In another embodiment, the section message 611 may omit the NS field. Instead of explicitly specifying how many ready sections, the base station may just list their section numbers, since the user devices can determine the number of ready sections by counting the section numbers that follow.

FIG. 6B is a flowchart showing an exemplary embodiment of a process for user devices to provide scheduling requests of low and high priority, according to some embodiments. As depicted in this non-limiting example, at 650 a base station assigns each user device to one of a plurality of sections and a particular position in its section. At 651, base station initiates an SR session. High-priority user devices are served first. Each high-priority user device has an exclusive resource element assigned, so that they can transmit a short scheduling request and obtain uplink service with low latency. At 652, the base station also allocates a section poll which the low-priority ready users can insert signals according to their section number.

Before doing anything with the section poll, other than receiving it, the base station at 653 provides a BSR grant to each requesting high-priority user, receives its BSR message, provides a message grant, and receives the high-priority data message.

Then, at 654, the base station broadcasts a section message listing the ready sections. The section message, if modulated, may include a demodulation reference or be proximate to one. At 655, each low-priority ready user then transmits a short scheduling request signal in an allocated low-priority user poll region. The ready user indicates its section number according to the symbol-time of its signal, and indicates its position in that section according to the subcarrier of its signal. The base station then identifies the ready users accordingly, provides BSR grants, receives their BSR messages, provides message grants, and receives the low-priority data messages.

In another embodiment, the base station may delay the section poll if any high-priority user device transmits during the high-priority user poll region. In that case, the base station may serve those high-priority users first, and then allocate resources for the section poll. In yet another embodiment, the base station may initiate separate high-priority sessions and low-priority sessions at different times, thereby avoiding delays and interference between the two classes of users.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a base station to communicate in a wireless network comprising a plurality of user devices in signal communication with the base station, the method comprising:

allocating the plurality of user devices among integer Ns sections;

receiving one or more signals in a first region of a resource grid;

determining, from each signal, which one of the sections includes a user device seeking an uplink grant;

receiving further signals in a second region of a resource grid, and determining, from the further signals, which user devices seek uplink grants; and broadcasting a section message indicating which sections include at least one user device seeking an uplink grant, wherein the section message comprises Ns subcarriers and a single symbol-time.

2. A method for a base station to communicate in a wireless network comprising a plurality of user devices in signal communication with the base station, the method comprising:

allocating the plurality of user devices among integer Ns sections;

receiving one or more signals in a first region of a resource grid;

determining, from each signal, which one of the sections includes a user device seeking an uplink grant;

receiving further signals in a second region of a resource grid, and determining, from the further signals, which user devices seek uplink grants; and broadcasting a section message indicating which sections include at least one user device seeking an uplink grant, wherein the section message comprises one or more section numbers of ready sections, a ready section comprising a section associated with at least one user device seeking an uplink grant.

3. A method for a base station to communicate in a wireless network comprising a plurality of user devices in signal communication with the base station, the method comprising:

allocating the plurality of user devices among integer Ns sections;

receiving one or more signals in a first region of a resource grid;

determining, from each signal, which one of the sections includes a user device seeking an uplink grant;

receiving further signals in a second region of a resource grid, and determining, from the further signals, which user devices seek uplink grants; and broadcasting a section message indicating which sections include at least one user device seeking an uplink grant, wherein the section message further indicates how many sections include at least one user device seeking an uplink grant.

4. A method for a base station to communicate in a wireless network comprising a plurality of user devices in signal communication with the base station, the method comprising:

allocating the plurality of user devices among integer Ns sections;

receiving one or more signals in a first region of a resource grid;

determining, from each signal, which one of the sections includes a user device seeking an uplink grant;

receiving further signals in a second region of a resource grid, and determining, from the further signals, which user devices seek uplink grants;

broadcasting a section message indicating which sections include at least one user device seeking an uplink grant;

allocating a high-priority user region of the resource grid;

receiving a high-priority signal in the high-priority region; and before transmitting the section message, determining which particular user device transmitted the high-priority signal, and transmitting an uplink grant to the particular user device.

5. A particular user device, of a wireless network comprising a plurality of user devices, the particular user device configured to:

receive a particular section number;

transmit a first signal in a section poll, the section poll comprising a first plurality of resource elements;

receive a section message indicating one or more section numbers comprising at least the particular section number;

transmit, responsive to receiving the section message, a second signal in a user poll, the user poll comprising a second plurality of resource elements; and receive an uplink grant;

wherein the section message comprises one or more section numbers of ready sections, a ready section comprising a section associated with at least one user device seeking an uplink grant.

6. The particular user device of claim 5, wherein the first signal is transmitted in a particular resource element of the section poll according to the particular section number.

7. The particular user device of claim 5, wherein the section message indicates the particular section number.

8. The particular user device of claim 5, wherein the second signal is transmitted in a resource element of the user poll according to the particular section number and according to a particular position number assigned by the network.

9. Non-transitory computer-readable media in a memory of a base station of a wireless network comprising user devices, the media containing instructions that, when executed by a computing environment, cause a method to be performed, the method comprising:

assigning, to each user device, a section number and a position number, respectively;

allocating the user devices among integer Ns sections;

broadcasting a section message indicating which sections include at least one user device seeking an uplink grant, wherein the section message comprises Ns subcarriers and a single symbol-time;

allocating a section poll, comprising a symbol-time and a plurality of subcarriers, for one or more user devices to transmit a first signal, the first signal indicating which sections include at least one user device ready to transmit a data message;

allocating a user poll, comprising one or more symbol-times and one or more subcarriers, for user devices to transmit a second signal, the second signal indicating which user devices are ready to transmit a data message, respectively;

receiving the second signals and determining therefrom which particular user devices are ready to transmit data messages; and transmitting an uplink grant to each of the particular user devices.

10. The media of claim 9, the method further comprising:

determining, from the section poll, which sections include at least one user device ready to transmit a data message; and broadcasting a section message indicating which sections include at least one user device ready to transmit a data message.

11. The media of claim 9, wherein the section poll includes a number of subcarriers equal to a number of sections in the network.

12. The media of claim 9, wherein the user poll comprises a number of symbol-times equal to a number of sections that have at least one user device ready to to transmit a data message, and the user poll further includes a number of subcarriers equal to a maximum number of user devices in the sections.

* * * * *